United States Patent
Touzni et al.

(10) Patent No.: US 7,031,405 B1
(45) Date of Patent: Apr. 18, 2006

(54) CARRIER PHASE ESTIMATION BASED ON SINGLE-AXIS CONSTANT MODULUS COST CRITERION AND BUSSGANG CRITERIA

(75) Inventors: Azzedine Touzni, Doylestown, PA (US); Raúl A. Casas, Doylestown, PA (US); Thomas J. Endres, Kent, WA (US); Stephen L. Biracree, Jamison, PA (US); Christopher H. Strolle, Fort Washington, PA (US); Samir N. Hulyalkar, Newtown, PA (US)

(73) Assignee: ATI Research, Inc., Santa Clara, CA (US)

( * ) Notice: Subject to any disclaimer, the term of this patent is extended or adjusted under 35 U.S.C. 154(b) by 788 days.

(21) Appl. No.: 09/922,006

(22) Filed: Aug. 3, 2001

Related U.S. Application Data

(60) Provisional application No. 60/248,941, filed on Nov. 15, 2000.

(51) Int. Cl.
*H04L 27/14* (2006.01)
(52) U.S. Cl. .................... 375/326; 375/233; 375/324; 375/340; 375/350
(58) Field of Classification Search ............... 375/326, 375/232, 233, 219, 229, 230, 234, 321, 355, 375/324, 340, 350; 348/725, 638
See application file for complete search history.

(56) References Cited

U.S. PATENT DOCUMENTS

| | | | | |
|---|---|---|---|---|
| 5,692,011 A | * | 11/1997 | Nobakht et al. | 375/233 |
| 5,852,630 A | * | 12/1998 | Langberg et al. | 375/219 |
| 5,872,815 A | | 2/1999 | Strolle et al. | 375/321 |
| 6,418,164 B1 | * | 7/2002 | Endres et al. | 375/232 |
| 6,426,972 B1 | * | 7/2002 | Endres et al. | 375/229 |

OTHER PUBLICATIONS

Filho et al. (new bussgang method for blind equalization Acoustics, Speech, and Signal Processing, 1997. ICASSP-97, 1997 IEEE International Conference on, vol.: 3, Apr. 21-24, 1997, pp.: 2269-2272 vol. 3).*

(Continued)

*Primary Examiner*—Stephen Chin
*Assistant Examiner*—Ted M. Wang
(74) *Attorney, Agent, or Firm*—Steve Mendelsohn

(57) ABSTRACT

Carrier phase recovery employs a single-axis blind cost criterion from the Bussgang class of functions, and its stochastic gradient, to generate a carrier phase error used to adjust a received and demodulated signal to near baseband. For one implementation, the estimate is derived in accordance with a Single-Axis Constant Modulus (SA-CM) criterion and its stochastic gradient via a SA-CM algorithm (SA-CMA). The carrier phase error is then used to adjust the carrier frequency and phase of the received and demodulated signal toward the frequency and phase of the carrier used to modulate the transmitted symbols, driving the carrier phase error to zero. The values used for the phase recovery may be either i) an IIR filtered signal, ii) a processed signal (e.g., decisions for the signal symbols), or iii) an equalized and processed signal.

40 Claims, 6 Drawing Sheets

OTHER PUBLICATIONS

"Self-Recovering Equalization and Carrier Tracking in Two-Dimensional Data Communication Systems" by D. N. Godard, IEEE Transactions on Communications, vol. 28, No. 11, Oct. 1980, pp. 1867-1875.

"A New Approach to Multipath Correction of Constant Modulus Signals" by John R. Treichler and Brian G. Agee, IEEE Transactions On Acoustics, Speech, And Signal Processing, vol. ASSP-31, No. 2, Apr. 1983, pp. 459-471.

"Global convergence Of A Single-Axis Constant Modulus Algorithm" by A. Shah, et al, Proceedings of the Statistical Signal and Array Processing Workshop, Pocono Manor, PA, Aug. 2000.

"Blind Deconvolution" by Simon Haykin, Chapter 2, Prentice Hall, Englewood Cliffs, NJ, 1994, pp. 8-59. cv.

* cited by examiner

CARRIER PHASE ESTIMATION BASED ON SINGLE-AXIS CONSTANT MODULUS COST CRITERION AND BUSSGANG CRITERIA

CROSS-REFERENCE TO RELATED APPLICATIONS

This application claims the benefit of the filing date of U.S. provisional application No. 60/248,941, filed on Nov. 15, 2000.

BACKGROUND OF THE INVENTION

1. Field of the Invention

The present invention relates to carrier phase and frequency detection in a receiver of a digital communications system.

2. Description of the Related Art

In many digital communications systems, a source generates digital information for transmission to multiple destination receivers. A transmitter processes the digital information into an encoded (e.g., error-correction encoded) and/or packetized stream of data. The stream of data is then divided into discrete blocks. Each of the blocks is mapped onto a corresponding one of a sequence of code or symbol values ("symbols") chosen from a pre-defined alphabet A, and generated with a period $T_S$, sometimes referred to as the "baud" period. Symbols may be modulated by an analog, e.g., radio frequency (RF), carrier, in amplitude, phase, and/or frequency prior to physical transmission through the communication medium. Many methods of mapping exist and are well known in the art, and these pre-defined alphabets are generated based on certain criteria. For example, data may be mapped into symbols of a complex data stream as pairs of in-phase (I) and quadrature phase (Q) component values that are subsequently modulated with an RF carrier.

A receiver performs several functions to demodulate and decode a received signal. Receiver functions include, for example, tuning and RF demodulation of the received signal to an intermediate frequency (IF) signal, synchronization with the RF carrier, equalization, symbol detection, and decoding.

FIG. 1 shows a typical prior art communication system 100 that may be employed for transmission and reception of digital television signals. Communication system 100 comprises transmitter 101 transferring signals through transmission medium 102 to receiver 103. Transmitter 101 comprises digital encoding system 111, premodulator/pulse shaper 112, radio frequency (RF) upconverter 113, carrier oscillator 115, and transmit antenna 114. Transmitter 101 receives user data from information source 110 (such as video, audio, and/or computer files) coupled to digital encoding system 111. Digital encoding system 111 may provide analog-to-digital (A/D) conversion, error-correction encoding, and/or bit-to-symbol mapping to generate a sequence of symbols selected from a predetermined alphabet. For example, data may be mapped into a complex-valued signal stream with pairs of in-phase (I) and quadrature phase (Q) components. Digital encoding system 111 provides the symbols to pre-modulator/pulse shaper 112. Pre-modulator/pulse shaper 112 modifies the symbols for the particular type of modulation, and may include a filter for pulse shaping of the symbols. The signal generated by pulse shaper 112 is provided to RF upconverter 113 which i) uses the signal to modulate a complex radio frequency (RF) carrier provided by carrier oscillator 115, and ii) amplifies and filters the signal. The modulated and amplified RF carrier is then emitted into the transmission medium 102 as an RF signal via transmit antenna 114.

Various modulation techniques, such as quadrature amplitude modulation (QAM), phase-shift keyed (PSK) modulation, or vestigial sideband (VSB) modulation are known in the art of communications to modulate the carrier. For example, modulation formats such as VSB are common formats used for transmission of digital television signals in accordance with, for example, the ATSC standard for digital television, "ATSC Digital Television Standard," Doc. A/53, September 1995.

For these modulation techniques, a quadrature oscillator may be employed with a complex RF upconverter to form a modulator. The I signal component modulates the cosine component generated by the oscillator and the Q signal component modulates the sine component of the oscillator. VSB modulation is a form of single-sideband modulation in which the redundant sideband of a real-valued signal is removed in full by filtering, except for a small vestige of the sideband. For complex VSB modulation, a complex signal is formed with the Q component being the Hilbert transform of the I component (however, the Q-component thus contains no additional user information).

FIG. 2 shows complex VSB modulation implemented by premodulator/pulse shaper 112, carrier oscillator 115, and RF upconverter 113 of transmitter 101 in FIG. 1. The signal from digital encoding system 111 is split into two paths: an upper path and a lower path. The signal in the upper path is filtered with Hilbert filter 201 and shifted in phase by 90° with multiplier 204, creating the Q (imaginary) component of the VSB signal. The signal in the lower path is applied to delay 202, creating a delayed version of the lower signal corresponding to the I (real) component of the VSB signal. The signals from the upper and lower paths are combined in adder 205 to form the complex VSB signal. The complex VSB signal excites pulse shaper 203 to generate pulses having a shape optimized for detection at the receiver. Up-converter 113 then up-converts the output signal of pulse shaper 203 to the RF carrier frequency with a complex RF modulator using the complex carrier generated by oscillator 115.

The modulated carrier signal transmitted through the medium 102 (which may be, e.g., wire, optical fiber, atmosphere, space, etc.) comprises a series of analog pulses, each analog pulse being amplitude and/or phase modulated by a corresponding symbol in the sequence. The pulse shape used typically extends many symbol periods in time. This introduces the possibility of adjacent pulses corrupting each other, a phenomenon known as inter-symbol interference (ISI).

Returning to FIG. 1, receiver 103 includes antenna 120 receiving the signal from the medium 102, complex demodulator and sampler 121, timing recovery module 122, equalizer 123, and carrier recovery module 124. Carrier recovery module 124 includes reference generator 126 and phase detector 125. Complex demodulator and sampler 121 translates the received signal from RF to intermediate frequency (IF), and performs complex demodulation of the received signal at IF to near passband employing the locally generated reference for the carrier signal. Complex demodulator and sampler 121 also samples the signal based on an estimate of the symbol period. Timing recovery module 122 estimates the symbol timing period $T_S$, and this estimate may be fed back to complex demodulator and sampler 121 to adjust the sampling rate (e.g., via a sampling phase error). Timing recovery thus synchronizes sampling instances to the top-dead-center of the pulse shapes, and then tracks variations in the detected period and phase of $T_S$.

Equalizer 123 applies equalization to the received samples, e.g. to correct for ISI, and may generate a cost error term used by timing recovery module 122 to adjust its estimate of the symbol timing period $T_S$. Carrier recovery module 124 generates estimates for the difference in frequency and phase (collectively referred to as angle θ) of the carrier used to modulate the symbols and the locally generated reference used for demodulation. From the estimate of angle θ, carrier recovery module 124 adjusts the reference for complex demodulation to adjust the received signal to precise baseband. A detector 150, typically implemented with a slicer, examines each sample to generate either a soft or hard decision for the symbol that corresponds to the sample. After symbol detection, a decoder 151 reconstructs the transmitted data from the symbol sequence.

Many methods exist in the art for achieving synchronization of sample timing and/or carrier recovery. One method uses a separate pilot tone or preamble pattern in phase with the modulation process that is transmitted in addition to the information-bearing signal. The receiver derives synchronization measures from the separately transmitted information e.g., from the pilot tone. However, including a separate signal for synchronization reduces channel throughput (and uses both extra power and bandwidth) for pilot tone transmission and reception. Consequently, many applications use blind recovery techniques in which information for synchronization is derived from the received signal itself without the aid of side information, such as a pilot tone.

A receiver generally requires accurate knowledge of the received carrier signal's frequency and the carrier signal's phase offset (i.e., angle θ). Estimates of carrier frequency and phase offset are required to properly recover I and Q components of a passband or near-baseband signal and adjust the received signal to precise baseband for symbol detection. The estimation of carrier frequency and phase may be generated using samples obtained prior to equalization by equalizer 123, or equalized samples from equalizer 123.

A two-step procedure is often used in the prior art to accurately estimate the carrier frequency and phase offset at a given moment. The first step derives a coarse estimate of the frequency and phase offset, which reference generator 126 may generate directly from the samples. The second step derives a fine (i.e., an adaptive) estimate, and a phase tracking loop is generally employed including reference generator 126 and phase detector 125. The fine estimate tracks the phase jitter introduced into the received signal by 1) time-varying channel impairments and 2) phase noise introduced by low-cost tuner oscillators. Carrier estimation may be performed in discrete time, in continuous time, or in a combination of both discrete and continuous time.

The carrier tracking loop may use an estimated error as a control signal to the reference generator to minimize rotation between I and Q components of a locally generated estimate of the carrier signal ("reference") and the received carrier signal. Alternatively, the estimated error may be processed to generate the error angle θ that is then used to de-rotate the demodulated signal. Phase detector 125 generates the measure (i.e., the error angle θ) between the reference and received carrier signal. The reference may be generated from a separate synchronization signal at the transmitter (termed "trained estimation") or derived from the information signal itself (termed "blind estimation"). Trained estimation may be based on a continuous wave, such as a pure tone signal or a pseudo-random (PR) sequence of digital symbols, generated by the transmitter. For systems using blind estimation, the reference is not known to the receiver, and two typical techniques employed in the prior art are "power of N" and "decision directed" carrier recovery.

In power-of-N carrier recovery, the received signal is raised to the power N to create a strong spectral line at frequency $2\pi Nf_c$, where N is positive and $f_c$ is the carrier frequency. The phase detector compares the phase of the signal raised to the power N to an initial estimated phase. The output (error) signal of the phase detector is loop filtered and applied to a voltage-controlled oscillator (VCO) with natural frequency $2\pi Nf_c$. The output of the VCO corresponds to the estimated phase of the transmitted signal. The estimated offset is fed back to the phase detector and compared to the signal raised to the power N. The procedure is repeated until the error signal at the output of the phase detector is minimized. Power-of-N carrier recovery generally produces a noisy estimate of the carrier phase and frequency.

Decision-directed carrier recovery employs a phase detector that measures the angle θ between the received and (estimated) reference I and Q components that correspond to a nearest predefined symbol or "alphabet" member. Since each transmitted character is formed from known I and Q component values in amplitude and phase, the reference I and Q components are derived from the estimate (receiver's guess) of which symbol is received and under study. The output of the phase detector is coupled to a loop filter that controls the VCO generating the reference I and Q components. The output of the VCO is fed back to the phase detector to complete the phase tracking loop. Decision-directed carrier recovery is typically employed when the overall system Signal-to-Noise Ratio (SNR) is high.

Trained estimation is similar to blind estimation, except that the receiver uses the received reference to reduce error from estimation of the reference. For example, in carrier estimation based on a pilot tone, the estimate is derived in a manner similar to that of the power-of-N blind carrier estimate, but a pure tone signal of arbitrary frequency sent by the transmitter and known at the receiver aids in carrier estimation. For the ATSC standard for broadcast of digital television in the U.S., the transmitter embeds a single pilot tone at the band edge of the data spectrum. Mean square error estimation is comparable to the decision-directed blind estimation, but the angle between the components is computed by minimizing squared Euclidean distance between I and Q components of an estimated symbol sequence and a sequence generated by the transmitter (i.e., the training reference signal).

A receiver also generally applies equalization to the sample sequence prior to forming hard decisions for symbols. Equalization is used to suppress the effects of ISI, caused by phenomena such as i) residual timing error, ii) pulse shape/multipath distortion from the propagation channel, and/or iii) approximation of the ideal transmit and receive filters for ease of implementation. Adaptive equalizers may also use blind recovery techniques to derive tap coefficients for the equalizer filters.

One such blind cost criterion employed for equalization is the constant modulus (CM) criterion. The stochastic gradient descent of the CM criterion is known as the Constant Modulus Algorithm (CMA). The CMA algorithm is described in an article by D. N. Godard entitled "Self-Recovering Equalization in Two-Dimensional Data Communication Systems," *IEEE Transactions on Communications*, vol. 28, no. 11, pp. 1867–1875, October 1980, which is incorporated herein by reference. The CM criterion and CMA algorithm were further developed to de-couple equalization and carrier recovery functions in a receiver. Such use of the CM criterion and CMA algorithm for equalization is described in J. R. Treichler et al., "A New Approach to Multipath Correction of Constant Modulus Signals," *IEEE Transactions on Acoustics, Speech, and Signal Processing*, vol. ASSP-31, no. 2, April 1993, which is incorporated herein by reference. Systems that use such CMA algorithm for adaptive equalization, such as that described in U.S. Pat. No. 5,872,815 to Strolle et al., do not employ the CM criterion for timing or carrier phase recovery.

The CM criterion penalizes the deviation of the dispersion of the magnitude squared of the received signal from a pre-calculated constant referred to as the "dispersion constant" or the "Godard radius." FIGS. 3A and 3B illustrate that the constant modulus criterion is based on deviation from a "radius" about the origin of, for example, a source constellation. FIG. 3A shows a radius 301 of an 8-PSK (phase-shift keyed) constellation plotted for real (e.g., Re or I) and imaginary (e.g., Im or Q) components. In FIG. 3A, each point (symbol) lies on the circle defined by this radius (termed a constant modulus system), and the CM criterion penalizes distance of a received sample (e.g., sample 302) from this circle. Even though the constellation may rotate, the constellation remains on the circle, and so applying a CM criterion to this constellation does not penalize spatial rotation of the constellation due to residual carrier offset. FIG. 3B shows a 16-QAM (quadrature amplitude modulation) constellation plotted for real and imaginary components. In FIG. 3B, groups of points (symbols) lie on corresponding concentric circles 311, 312, and 313. The CM criterion determines a radius 314 of circle 315, which is not necessarily a radius of one of the concentric circles 311, 312, and 313 (termed non-constant modulus), as a "common" radial distance from the origin for the points of the constellation. As with the constellation of FIG. 3A, the CM criterion penalizes distance of a received sample (e.g., sample 303) from this circle 315.

The CM criterion defines a cost function $J_{CM}$ that may be expressed as given in equation (1):

$$J_{CM} = E[(\rho^2 - |y_n(\tau, g)|^2)^2] \quad (1)$$

where $E[\bullet]$ denotes the expected value, $\rho^2$ is the dispersion constant (Godard radius), $y_n(\tau, g)$ is the discrete value that represents the sampled signal, $\tau$ represents the timing (sampling) phase, and g represents the equalizer taps introduced to suppress the ISI. The dispersion constant $\rho^2$ is a quantity that can be determined from the type of modulation employed (e.g., QAM, BPSK, etc.). The dispersion constant $\rho^2$ may be derived by calculation, by experiment, or by a combination of both for a particular implementation. For real-valued source, such as VSB, the CM criterion, and its stochastic gradient, may be modified by taking the real part of $y_n(\tau, g)$ in equation (1). The modified CM criterion is referred to as the single-axis (SA) CM criterion, and is given in equation (2).

$$J_{SA-CM} = E[(\rho^2 - Re\{y_n(\tau, g, \theta)\}^2)^2] \quad (2)$$

where $Re\{\bullet\}$ denotes the real-part extraction.

Given a defined cost function, the gradient of the cost function may be derived. The stochastic gradient is an approximation of the true gradient that is calculated by taking the derivative of the cost function without taking the expected value. For example, the stochastic gradient of the single-axis (SA) CM criterion is known as the SA-CMA and is derived by taking the derivative of equation (2) with respect to the variable of interest. Once the derivative is calculated, an error term may be defined that tends to drive the stochastic gradient to a relative minimum. For timing recovery, derivation of such stochastic gradient is described in U.S. patent application Ser. No. 09/761,303, entitled "Blind Cost Criterion Timing Recovery," filed on Jan. 17, 2001, by the inventors herein and is incorporated herein by reference.

SUMMARY OF THE INVENTION

The present invention relates to carrier recovery using carrier frequency phase error estimation employing a single-axis constant modulus (SA-CM) criterion to generate the carrier frequency phase error. The carrier phase error is used to adjust a received and demodulated signal from near to precise baseband. For one implementation, the estimate is derived in accordance with the stochastic gradient of the SA-CM criterion via the SA-CM algorithm (SA-CMA). The carrier phase error is then used to adjust the carrier frequency and phase of the received and demodulated signal toward the phase of the carrier used to modulate the transmitted symbols, driving the carrier phase error to a constant, such as zero.

In accordance with an exemplary embodiment of the present invention, carrier recovery in a demodulated signal formed from a data-modulated carrier i) generates an estimate of an angle between the carrier and the locally generated reference from the signal and based on a stochastic gradient of a single-axis cost function, the cost function being selected from a set of Bussgang-class cost functions; and ii) adjusts at least one of the frequency and phase of the demodulated signal based on the angle such that the magnitude of the angle is driven to a predetermined value.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
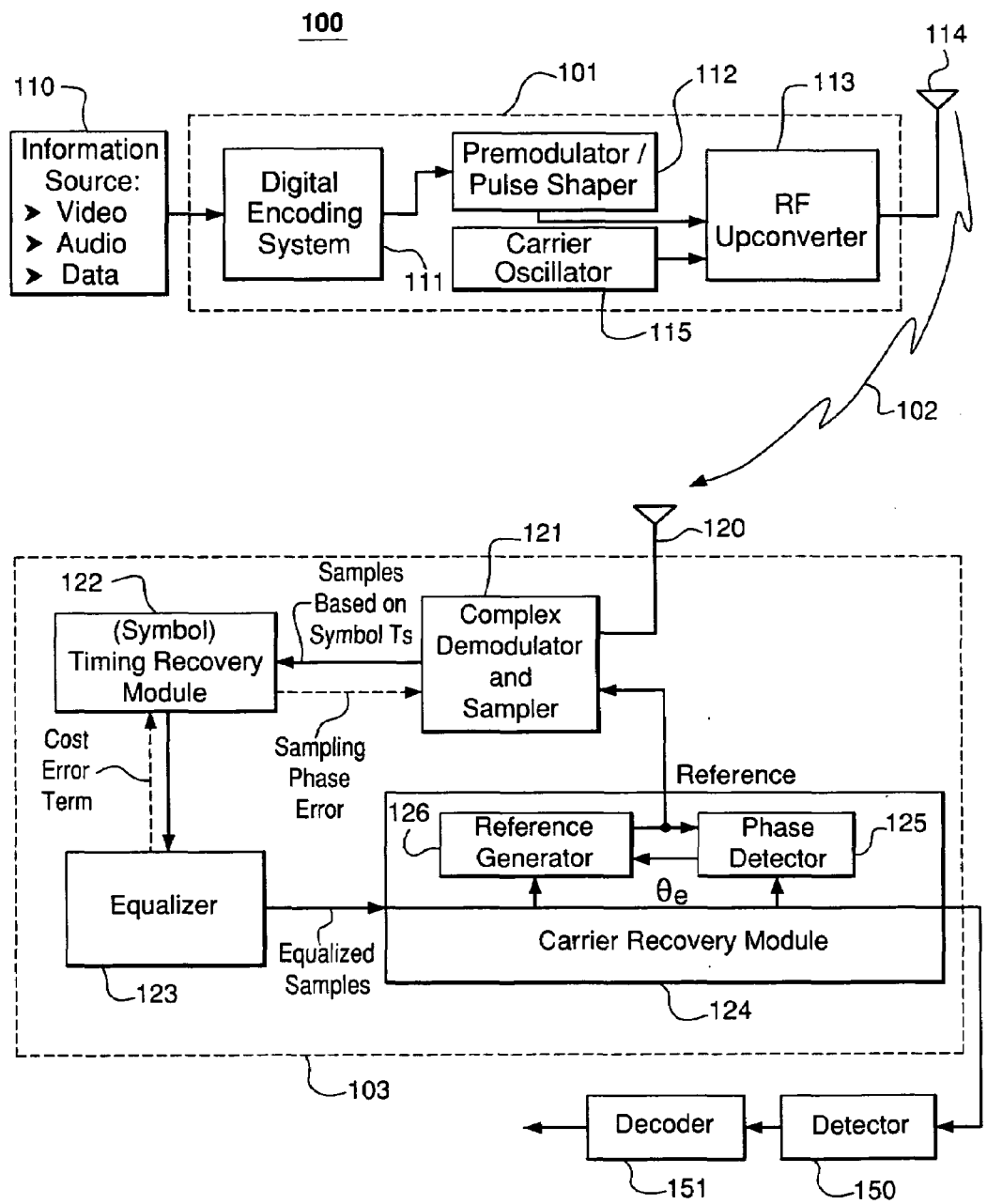
FIG. 1 shows a typical prior art communication system that may be employed for transmission of digital television signals.
Figure 2:
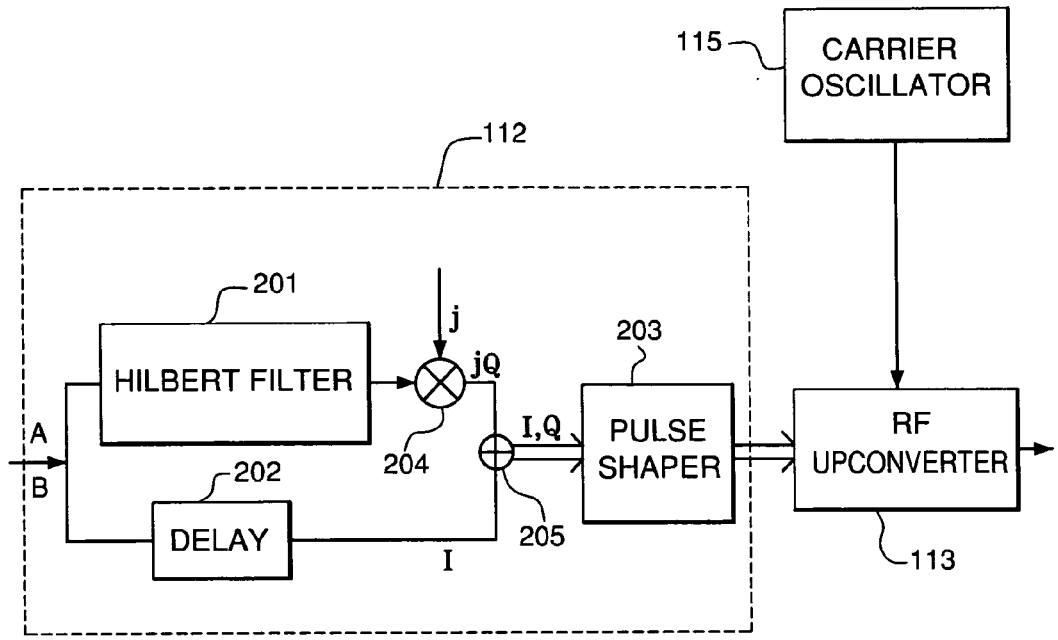
FIG. 2 shows a prior art vestigial sideband (VSB) modulator that may be employed by the transmitter of FIG. 1.
Figure 3A:
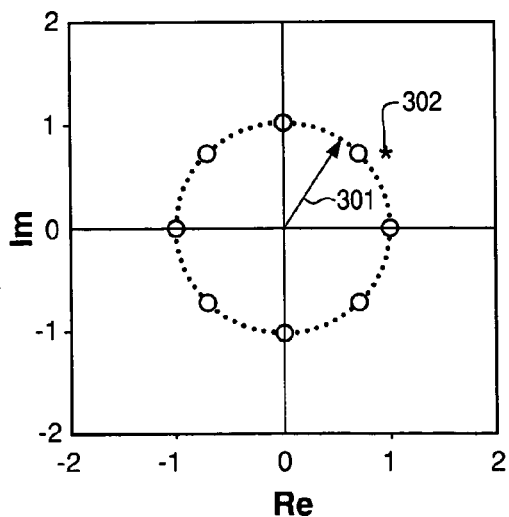
FIG. 3A illustrates a constant modulus criterion based on determining a radius about the origin of an 8-PSK source constellation.
Figure 3B:
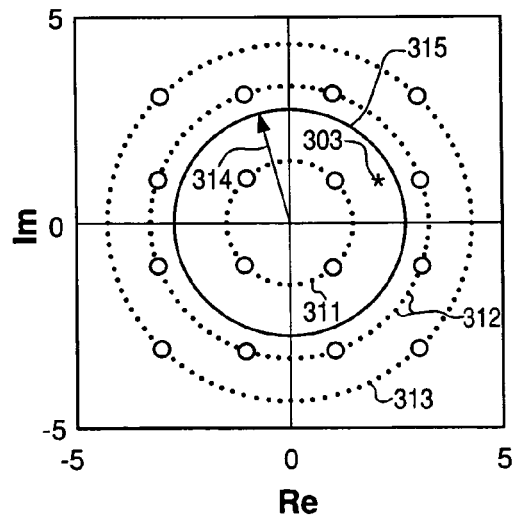
FIG. 3B illustrates a constant modulus criterion based on determining a radius about the origin of a 16-QAM source constellation.
Figure 4:
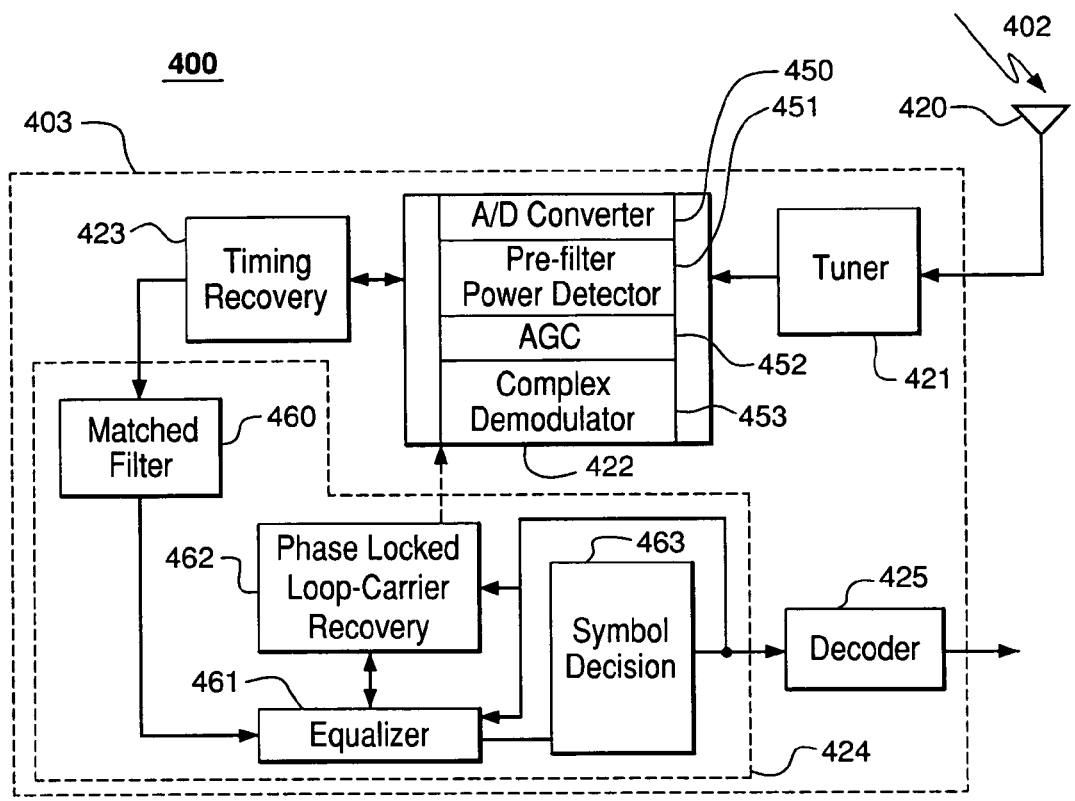
FIG. 4 shows a receiver of a digital communication system that employs carrier recovery in accordance with embodiments of the present invention based on a single-axis, blind cost criterion.

FIG. 4 shows a receiver section 400 of a digital communication system that employs residual carrier phase recovery and synchronization (termed herein as carrier recovery) based on the single-axis blind cost criterion in accordance with embodiments of the present invention. Carrier recovery determines an estimate of the angle θ representing the phase error between the transmit carrier signal and the locally generated carrier signal, and uses the estimate to minimize the phase error, such as by driving the phase error to zero. The preferred embodiments described herein employ the single-axis constant modulus (SA-CM) cost function and a carrier phase error term derived from its stochastic gradient (the stochastic gradient descent of the SA-CM cost function) to generate an estimate of the angle θ. Carrier recovery in accordance with embodiments of the present invention generates a carrier phase error employing the SA-CM error term and a derivative of the demodulated signal with respect to the angle θ. Embodiments of the present invention tend to adjust the residual carrier frequency/phase of the received signal in a manner opposite to that of the error term, and thus drive the carrier phase error, and the angle θ, to zero.

Receiver 400 receives modulated signals from transmission medium 402, and receiver 400 may be employed in a digital communication system broadcasting digital television signals in accordance with, for example, the ATSC standard for digital television, "ATSC Digital Television Standard," Doc. A/53, September 1995. Consequently, the preferred embodiments of the present invention operate on received signals having complex VSB modulation format. VSB is the modulation format adopted for terrestrial broadcast of digital television signals in the United States by the ATSC standard.

FIG. 4 shows the signal path of I and Q components (and processing) as a single line, though they may be conveyed and/or processed through separate paths. In general, signals within receiver 400 may be complex-valued, though for some applications only I components are used. In addition, while the figures illustrate carrier recovery in a digital television receiver, many components in addition to those shown may exist, but these additional components are not necessary to understanding the present invention and are omitted for simplicity.

Returning to FIG. 4, receiver 400 comprises receive antenna 420, tuner 421, demodulator/downconverter 422, timing recovery module 423, detector 424, and decoder 425. Antenna 420 receives the RF signal from the transmission medium 402. The received RF signal may have added phase and amplitude noise, doppler shift, multipath effects, distortion, dispersion, and/or other effects typically associated with the particular transmission medium.

Tuner 421 isolates the RF signal of interest received through antenna 420 from medium 402 and translates the signal, in frequency, to an intermediary frequency (IF) signal ("passband signal"). Many different techniques exist in the art for demodulating a modulated RF carrier to provide a near-baseband or passband signal, and some of these systems may not necessarily employ digital signal processing techniques. One skilled in the art would realize that the process of receiving, isolating, and demodulating the transmitted signal is described herein as an aide to the description of carrier recovery in accordance with exemplary embodiments of the present invention.

Demodulator/downconverter 422 processes the passband signal as follows. The received signal is sampled via an analog-to-digital (A/D) converter 450, creating a digital sample sequence. A/D converter 450 may generate sample values at a rate greater than the symbol period. As would be apparent to one skilled in the art, decimation and/or interpolation may be employed at various points within receiver section 403 to generate sample sequences at different sampling rates and different sampling phases. Demodulator/downconverter 422 may apply pre-filter/power detector 451 to the digital sample sequence to reduce noise effects and to generate a power level estimate for automatic gain control (AGC). The gain of the near-baseband signal is adjusted via an automatic gain control (AGC) circuit 452. The gain of the IF signal and/or RF signal may also be controlled via AGC circuits implemented similarly to that of AGC circuit 452. AGC circuit 452 controls the dynamic range of the near-baseband signal to within a predetermined range.

Complex demodulator 453 demodulates the received signal to a passband signal or to a near-baseband signal, and splits the demodulated signal into a complex sample sequence having in-phase (I) and quadrature phase (Q) components. Complex demodulator 453 may employ an oscillator generating sine and cosine components at a frequency and phase based on information derived by phase-locked loop/carrier recovery (PLL/CR) module 462 of detector 424 operating in accordance with an exemplary embodiment of the present invention, as described subsequently. The near-baseband signal is not at precise baseband due to sampling clock inaccuracies, oscillator phase noise, or doppler shift. Timing recovery module 423 aligns or otherwise synchronizes the period T and phase τ for sampling of the received signal to the symbol period (baud rate) $T_S$ and phase $τ_S$ of I and Q signal components of the transmitted signal, respectively.

The sequence of samples is then provided to detector 424, which generates an estimate for each sample corresponding to a transmitted symbol. Detector 424 filters the signal with matched filter 460 whose frequency response characteristic matches the frequency response of the transmitter's pulse shaper. For example, if the pulse shaper applies a filter corresponding to a square root-raised cosine function, the matched filter also applies a square root-raised cosine to i) create a Nyquist pulse at the matched filter output and ii) maximize signal-to-noise ratio (SNR).

Since transmission medium 402 may distort the signal waveform passing through it, each sample from timing recovery module 423 may include ISI effects of channel multipath. Equalizer 461 of detector 424 applies equalization to the sequence of samples from timing recovery module 423. Equalizer 461 may be implemented with an adaptive, multi-tap filter in a linear or non-linear architecture and with a finite or infinite impulse response. Equalizer 461 adjusts the sample values to remove distortion effects and restore the "zero ISI" characteristics of the sample sequence. For highly impaired media, such as media experiencing long echo multipath, decision feedback equalization (DFE) may be preferred over a linear filter. A decision feedback equalizer acts to additively cancel ISI.

PLL/CR 462 provides residual carrier synchronization based on a single-axis constant modulus (SA-CM) cost criterion in accordance with embodiments of the present invention. Carrier recovery translates the (sampled) signal from near to precise baseband by compensating for a residual offset between the carrier frequency of the transmitted signal and frequency for demodulation selected by tuner 421 and/or complex demodulator 453. Symbol decision module 463 generates a hard decision for each symbol from the corresponding equalized/compensated samples. While shown as part of detector 424, either detector 424 or decoder 425 may employ a symbol decision module 463, which may be typically implemented with a slicer, nearest element quantizer, maximum likelihood (ML) detector, or maximum a posteriori (MAP) detector.

Decoder 425 processes the sequence of symbol decisions to reverse the various levels of encoding (symbol-to-data mapping, error correction, re-formatting, and/or depacketizing) to reconstruct the original user information. Re-formatting may include decoding in accordance with a high-definition digital television standard (e.g., MPEG-1, MPEG-2).

In accordance with embodiments of the present invention, carrier recovery and synchronization by, for example, PLL/CR 462 operates "blindly". Thus carrier recovery and synchronization i) operate without using a reference signal, ii) includes a phase detector implementing adaptive carrier phase frequency estimation, and iii) the carrier loop generates the precise carrier frequency. The preferred embodiments of the present invention are described herein with respect to adaptive carrier-phase estimation employing the single-axis, constant modulus (SA-CM) criterion and its stochastic gradient descent (SA-CMA) providing the phase error terms $e_{SA-CM}$.

The SA-CM criterion may be defined for VSB signals, such as described in a paper by Shah et al, "Global convergence of a single-axis constant modulus algorithm," *Proceedings of the Statistical Signal and Array Processing Workshop*, Pocono Manor, Pa., August 2000, which is incorporated herein by reference. SA-CM for VSB signals and blind cost error terms generated from the stochastic gradient of SA-CM criterion are also described in U.S. patent application Ser. No. 09/100,705, entitled "A REDUCED COMPLEXITY BLIND EQUALIZER FOR MULTI-MODE SIGNALING," filed on Jun. 19, 1998. The SA-CM criterion is typically based on real-part extraction of the output signal after equalization, and may be used for both real- or complex-valued equalizer coefficients operating on either baseband or passband signals.

In accordance with embodiments of the present invention, a carrier tracking loop of PLL/CR 462 includes SA-CM based phase detection. For this case, the signal considered is a discrete signal present in detector 424 that is a function of the carrier phase angle $\theta$. Notice that contrary to prior art equation (1), equation (2) is a function of the phase of the sampled signal $y_n$. The cost function $J_{SA-CM}$ can therefore be jointly optimized with respect any of the variables $\tau, g$, or $\theta$. Defining sample $y_n(\theta)$ equivalently as $y_n(\tau, g, \theta)$ to indicate that the sample (a complex-valued signal) is a function of phase angle $\theta$ which is the parameter of interest, then the SA-CM criterion is given by equation (3):

$$J_{CM} = E[(\rho^2 - Re\{y_n(\theta)\}^2)^2]. \tag{3}$$

where $\rho^2$ is the Godard radius, $Re\{\bullet\}$ denotes real-part extraction, and $E(\bullet)$ denotes the expected value. The single-axis gradient descent may be determined by taking the expected value of the derivative of the cost function with respect to $y_n(\theta)$. The inventors have determined that an approximation of the gradient may be calculated without taking the expectation operation. Thus, the single-axis stochastic gradient at discrete time [n], is given by equation (4):

$$dJ_{CM}/d\theta = 4 \, e_{SA-CM}[n] dy_n(\theta)/d\theta \tag{4}$$

where the SA-CM phase error term at discrete time [n], $e_{SA-CM}[n]$, is given by equation (5):

$$e_{SA-CM}[n] = Re\{y_n(\theta)\}(\rho^2 - Re\{y_n(\theta)\}^2). \tag{5}$$

The value $\rho^2$ is a known constant for the type of modulation. The constant $\rho^2$ is calculated as the ratio of the fourth to second central source moments. For example, $\rho^2$ is 37 when VSB-8 modulation format is used with symbol values +/−1, +/−3, . . . , +/−7.

The derivative of $y_n(\theta)$ with respect to the angle $\theta$ may also be approximated as DT[n] for the purpose of calculating quantities from the sample sequence. The stochastic gradient SA-CMA employed by the phase detector is then expressed as in equation (6):

$$dJ_{CM}/d\theta = 4e_{SA-CM}[n] \, DT[n], \tag{6}$$

where the SA-CM phase error term is the same as equation (5), and where $DT[n] = dy_n(\theta)/d\theta$ is the exact or approximate derivative of $y_n(\theta)$ with respect to the angle $\theta$. SA-CM phase detection computes the product of the two quantities $e_{SA-CM}[n]$ and DT[n]. The "n" shown as a subscript and shown in brackets with respect to a variable is equivalent and indicates a digital sample value at discrete time n. It may be shown that operating in accordance with equation (7) is operation as a phase detector.

To track phase angle $\theta[n]$, a second order phase lock loop with SA-CM as the phase detector may use the update rule as given in equation (7):

$$\theta[n] = \theta[n-1] + 4F(z)e_{SA-CM}[n]DT[n] \tag{7}$$

where $\theta[n]$ is defined as an arbitrary rotation in phase (phase error) and where F(z) is a digital filter of the form given in equation (8):

$$F(z) = \gamma(\gamma_1 + \gamma_2/(1-z^{(-1)})), \tag{8}$$

where $\gamma, \gamma_1$, and $\gamma_2$ are programmable gains selected for the particular implementation. The first order implementation is referred to the case where $\gamma_2 = 0$.

Figure 5:
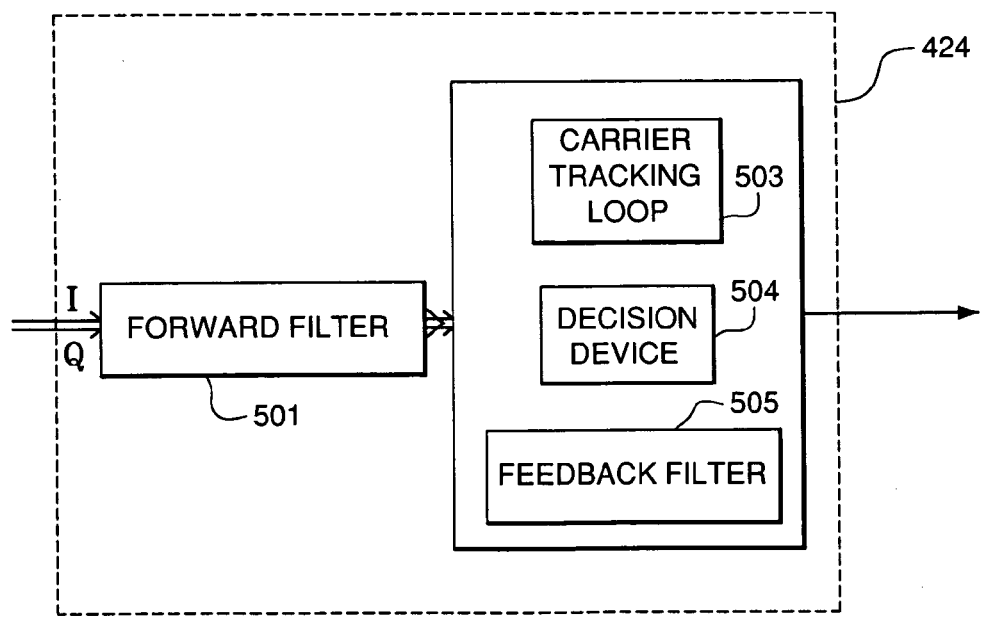
FIG. 5 shows a block diagram of the functional components of the detector of FIG. 4 including forward filter and feedback equalizer/carrier loop (FECL) module.

FIG. 5 is a block diagram showing the functional components of detector 424 including forward filter 501 and feedback equalizer/carrier loop (FECL) module 502 operating in accordance with the present invention. FECL module 502 includes carrier tracking loop 503, decision device 504, and feedback filter 505. Carrier tracking loop 503 generates estimates of the carrier phase error, denoted as the angle $\theta$, in accordance with embodiments of the present invention.

Decision device 504 is included in symbol decision module 463 (FIG. 4) and is employed by detector 424 to create a "hard" decision for an alphabet element (symbol) corresponding to an input sample. Decision device 504 may be typically implemented with a slicer. Several methods may be employed by a slicer to generate a hard decision for systems using VSB modulation. These methods include: (i) calculating the I component of the sample to the nearest (most likely) alphabet element and not processing the Q component of the sample; (ii) quantizing the I component of the sample and quantizing the Q component so that the phase angle of the complex input sample is unchanged; and (iii) quantizing the I component of the sample and generating the Q component of the sample using a Hilbert transform of the I component of the sample.

Alternatively equalizer 461 of FIG. 4 may be an adaptive, multi-tap feedback equalizer using finite impulse response forward and feedback filters to realize an infinite impulse response (IIR) equalizing filter. Forward filter 501, decision device 504, and feedback filter 505 are configured such that the output samples of the equalizer are filtered by feedback filter 505 and added to the output of forward filter 501. Equalizer 461 may be implemented with forward filter 501 and feedback filter 505 if equalizer 461 is a linear IIR equalizer (i.e., no hard or soft decision of decision device 504 is input to feedback filter 505). Alternatively, equalizer 461 may be implemented with forward filter 501, feedback filter 505, and decision device 504 if equalizer 461 is a feedback equalizer (i.e., a hard or soft decision of decision device 504 is input to feedback filter 505). A preferred embodiment of the present invention allows for switching between linear and decision feedback equalization operation.

Methods to generate tap values for the equalizer 461 are known in the art. For example, the CM criterion and CMA algorithm for equalization are described in J. R. Treichler et al., "A New Approach to Multipath Correction of Constant Modulus Signals," *IEEE Transactions on Acoustics, Speech, and Signal Processing*, vol. ASSP-31, no. 2, April 1993; and in U.S. Pat. No. 5,872,815 to Strolle et al. As referenced above, U.S. patent application Ser. No. 09/100,705 describes use of the SA-CM criterion and SA-CMA for adaptive equalization. Some embodiments of the present invention may employ the techniques of U.S. patent application Ser. No. 09/100,705 to generate tap values for forward filter 501 and feedback filter 505 when employed as a DFE.

Figure 6:
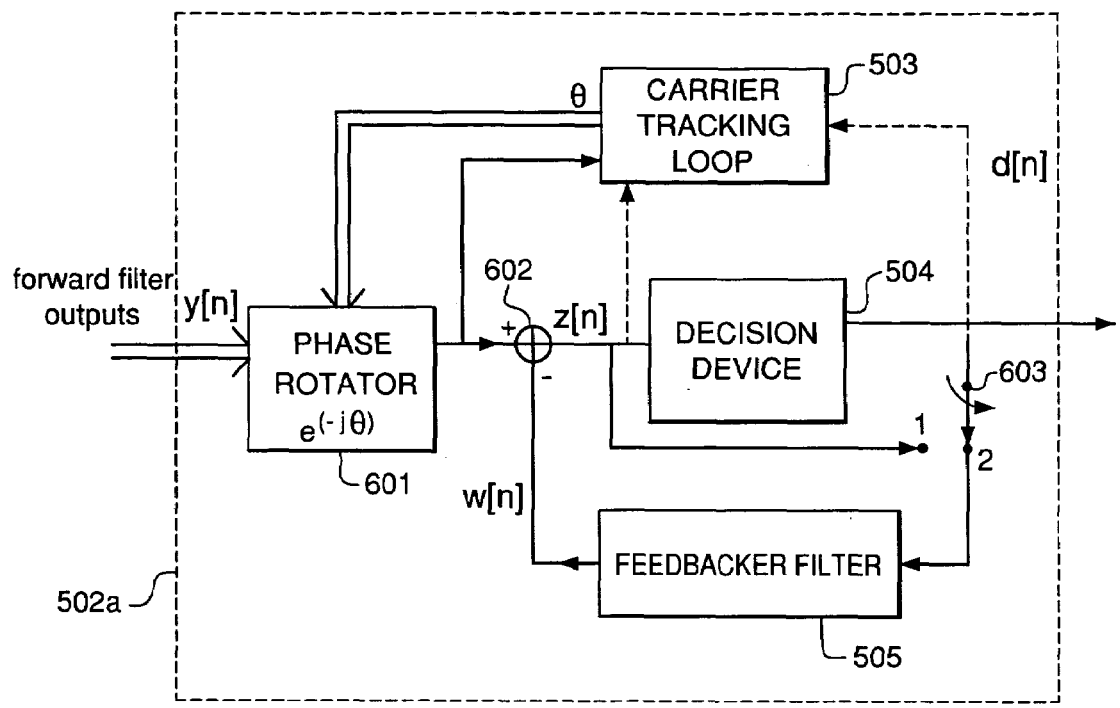
FIG. 6 shows an exemplary implementation of the FECL module of FIG. 5 in which the feedback filter operates with signals at the baseband.
Figure 7:
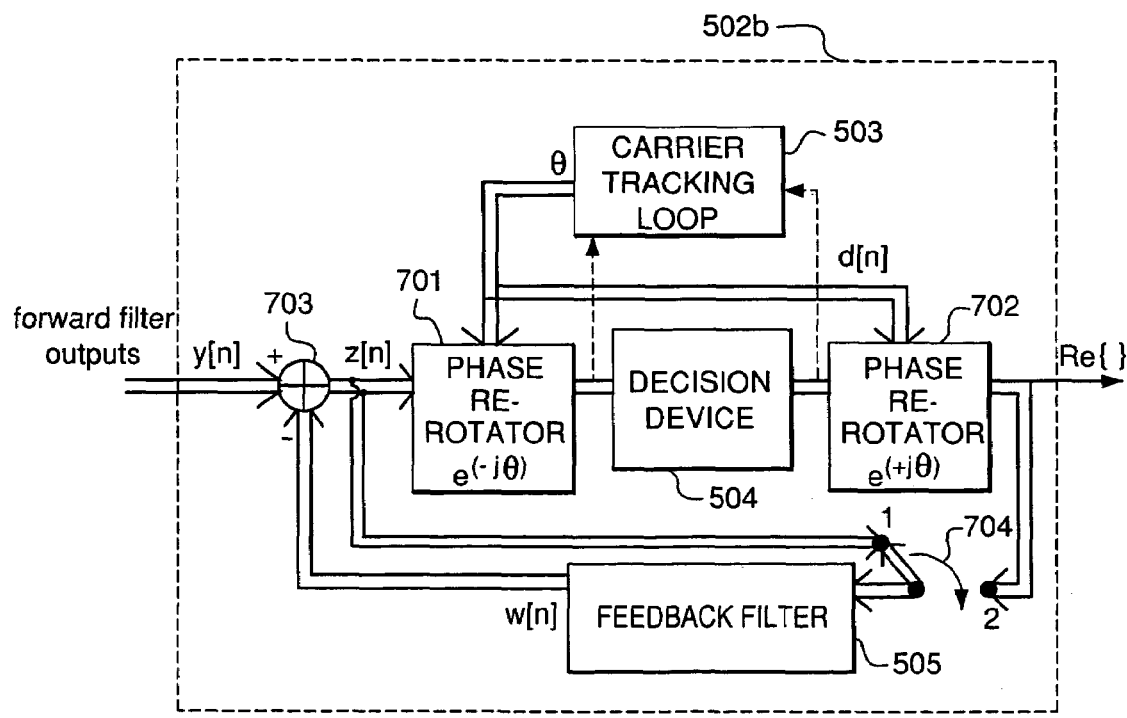
FIG. 7 shows an exemplary implementation of the FECL module of FIG. 5 in which the feedback filter operates with signals at the passband.

Returning to FIG. 5, interconnection of carrier tracking loop 503, decision device 504, and feedback filter 505 of FIG. 5 depends on when "de-rotation" of the signal samples (i.e., translation of samples to precise baseband) occurs in the implementation. One skilled in the art will realize that each implementation is a consequence of the model employed to describe perturbations on the channel phase. FIGS. 6 and 7 show implementations 502a and 502b, respectively, of FECL module 502 shown in FIG. 5 that receive the output samples of forward filter 501. FIG. 6 shows an implementation of FECL module 502a in which feedback filter 505 operates with signals at the baseband. FIG. 7 shows an implementation of FECL module 502b in which feedback filter 505 operates with signals at the passband.

Referring to FIG. 6, the complex (FIR) signal (sample stream from forward filter 501) is applied to phase rotator 601. Phase rotator 601 operates on the complex (I and Q) components, denoted $y_n(\theta)=I_n(\theta)+jQ_n(\theta)$, and translates the samples to baseband by computing the product $y_n(\theta)e^{-j\theta[n]}$, where $\theta[n]$ is an estimate at discrete time n of the carrier phase error (offset angle $\theta$). The rotated signal is combined with the output of the feedback filter 505 by real combiner 602. The output signal of combiner 602 is applied to decision device 504, which maps the output signal to the nearest alphabet symbol. When switch 603 is in position #1, the input to feedback filter 505 is the output of combiner 602 (e.g., when implementing a linear equalizer). When switch 603 is in position #2, the input to feedback filter 505 is the output of decision device 504 (e.g., when implementing a DFE).

Carrier tracking loop 503 receives either the output decisions of decision device 504 (e.g., the output symbol of the slicer), the output signal from combiner 602, or the output of the phase rotator 601, depending on the mode of operation. Modes of operation include decision-directed (DD) and blind (using SA-CMA phase detection as described herein) modes. For DD mode carrier phase estimation, carrier tracking loop 503 receives both the signal from combiner 602 and output decisions of decision device 504, and from these inputs generates the estimate for angle $\theta$. For blind mode carrier phase estimation, carrier tracking loop 503 includes a blind phase detector to calculate the value for carrier phase error given in equation (7), which value is then (approximately) integrated to give the output angle $\theta$.

Embodiments of the present invention operating in the baseband such as shown in FIG. 6 may generate an estimate of $\theta[n]$ using one of at least three baseband configurations. In a first exemplary configuration of FECL module 502a, carrier tracking loop 503 generates an estimate of $\theta[n]$ based on the input $\text{Re}\{y_n(\theta)e^{-j\theta[n]}\}$ provided by the I component output from phase rotator 601. In a second exemplary configuration of FECL module 502, carrier tracking loop 503 generates an estimate of $\theta[n]$ based on the input $\text{Re}\{y_n''(\theta)e^{-j\theta[n]}-w[n]\}$, where w[n] is the output of the feedback filter. In this second exemplary configuration, carrier phase correction is based on the I component output from combiner 602. In a third exemplary configuration of FECL module 502, carrier tracking loop 503 generates an estimate of $\theta[n]$ based on the output of decision device 504 and combiner 602.

As described previously, SA-CM phase detection computes carrier phase error with the stochastic gradient $dJ_{CM}/d\theta$ as given in equation (6) and repeated for convenience as follows:

$$dJ_{CM}/d\theta = 4e_{SA-CM}[n]DT[n], \qquad (6)$$

with $e_{SA-CM}[n]=(\text{Re}\{y_n(\theta)\}^2-\rho^2)\text{Re}\{y_n(\theta)\}$ and $DT[n]=d(y_n(\theta))/d\theta$ are as defined previously.

At discrete time n, the SA-CM phase detector of PLL/CR 462 operates on the previous estimate of $\theta[n-1]$ and on the inputs $\text{Re}\{y_n(\theta)\}$ and $\text{Im}\{y_n(\theta)\}$. The signal $\text{Re}\{y_n(\theta)\}$ is used to compute $e_{SA-CM}[n]$ by squaring $\text{Re}\{y_n(\theta)\}$, subtracting $\rho^2$ and multiplying the difference by $\text{Re}\{y_n(\theta)\}$. The phase detector signal is formed by multiplying $e_{SA-CM}[n]$ with DT[n] to drive a loop filter that adjusts the carrier phase of the sample sequence.

However, the data signal input to the carrier loop may be generated at different locations of the configurations of FIG. 6, and so values for $e_{SA-CM}[n]$ and DT[n] vary depending on the particular configuration. The location where the signal for the phase detector is generate depends implicitly of the model used for the channel.

Figure 8:
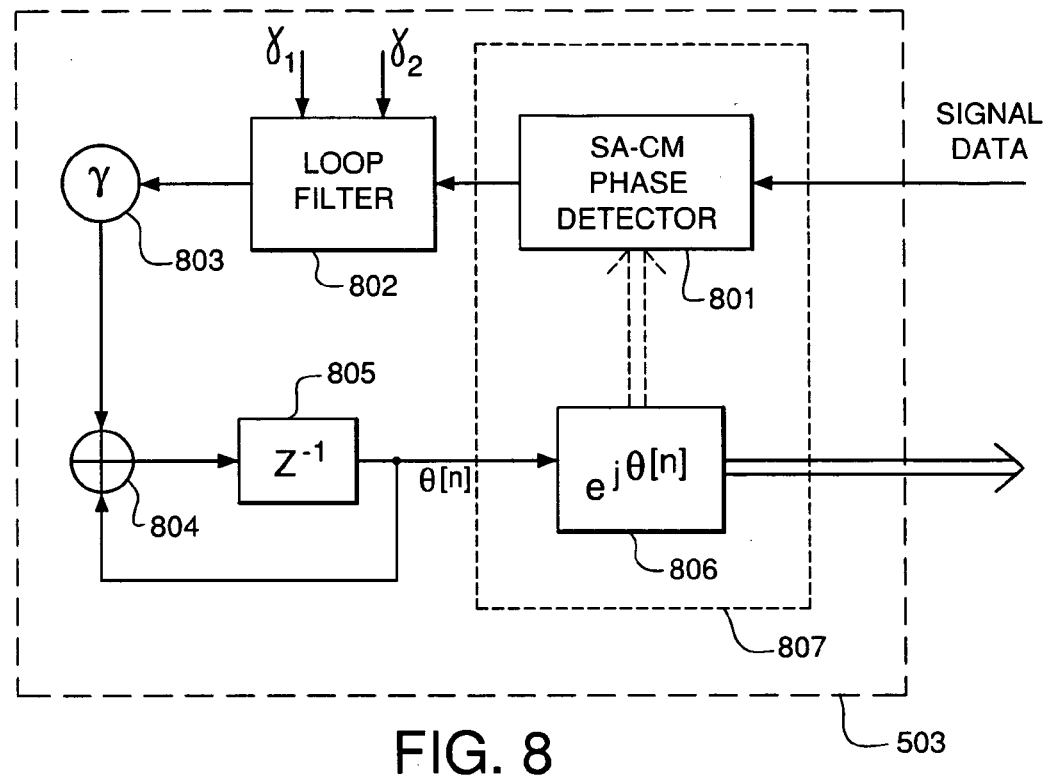
FIG. 8 shows an exemplary embodiment of the carrier tracking loop of FIG. 5.

FIG. 8 shows an exemplary embodiment of carrier tracking loop 503 with SA-CM phase detection. Signal data provided to carrier tracking loop 503 (e.g., generated from various paths as described with respect to FIGS. 6 and 7) is applied to SA-CM phase detector 801. SA-CM phase detector 801 generates a carrier phase error, which is an estimate of the derivative of the input signal with respect to the measure (in this case, phase angle $\theta[n]$) scaled by the blind cost criterion (i.e., SA-CMA) error term. The carrier phase error is filtered by (discrete-time) loop filter 802 driven by the parameters $\gamma_1$ and $\gamma_2$, and scaled by a constant $\gamma$ in scaler gain 803. To generate an estimate of phase angle θ[n], the output of scaler gain 803 is integrated. Combiner 804 and delay 805 implement an approximation to the integral to generate the estimate of phase angle θ[n]. Module 806 computes $e^{j\theta[n]}$ by generating the cosine and sine of phase angle θ[n].

For the first configuration of FECL module 502a shown in FIG. 6, the signal data is the output signal from phase rotator 601. The phase error term $e_{SA\text{-}CM}[n]$ of SA-CM detector 801 is computed with the data signal $y_n(\theta)e^{-j\theta[n-1]}$ using the previously generated value of phase estimate θ[n−1]. The contribution DT[n] is expressed as in equation (9):

$$DT[n]=Re\{y_n(\theta)e^{-j\theta[n]}\}=Re\{y_n(\theta)\}\cos(\theta[n])+Im\{y_n(\theta)\}\sin(\theta[n]), \quad (9)$$

where Re{●} extracts the (real) I component of the symbol. Equation (9) is an estimation of the derivative $d(y_n(\theta)e^{-j\theta[n]})/d\theta$ under the condition that $y_n(\theta)=y_n$.

For the second configuration of FECL module 502a shown in FIG. 6, the data signal is the output signal from combiner 602. The phase error term $e_{SA\text{-}CM}[n]$ of SA-CM detector 801 is computed with the data signal $y_n(\theta)e^{-j\theta[n]}-w[n]$. The contribution DT[n] is same as that in equation (9) given for the first configuration.

For the third configuration of FECL module 502a shown in FIG. 6, the data signal which is the input of the $e_{SA\text{-}CM}[n]$ equation is the output decision d[n] from decision device 503. In the phase error term $e_{SA\text{-}CM}[n]$ of SA-CM detector 801 the variable $y_n(\theta)$ is replaced with the decision d[n] as given in equation (10):

$$d[n]=f(Re\{y_n(\theta)e^{-j\theta[n]}-w[n]\}), \quad (10)$$

where f(●) is a non-linear function which stands for the decision function. The decision device as described in equation (10) operates on a real symbol. If we assume that f(●) is a differentiable function, then its derivative with respect to the variable "●" inside the brackets is denoted by f'(●). The contribution DT[n] is then expressed as in equation (11), $$DT[n]=f'(Re\{y_n(\theta)e^{-j\theta[n]}-w[n]\})Im\{y_n(\theta)e^{-j\theta[n]}-w[n]\} \quad (11)$$

where $Im\{y_n(\theta)e^{-j\theta[n]}-w[n]\}$ in the expression of DT[n] is the same as in the first and second configurations. For a given implementation of DT[n], the value of the derivative of f(●), shown as f'(●), is approximated using the difference of adjacent symbols.

As described previously, carrier recovery may also be implemented with the equalizer feedback filter operating in the passband. Returning to FIG. 7, FECL module 502b is shown including feedback filter 505 operating with input samples at the passband. The complex (FIR) signal (sample stream from forward filter 501) is applied to complex combiner 703. Complex combiner 703 combines I and Q components of the complex (FIR) signal with corresponding I and Q components generated by feedback filter 505. The input to feedback filter 505 is controlled by switch 704. When switch 704 is in position #1 the output of complex combiner 703 is applied to feedback filter 505 (linear IIR equalizer operation). When switch 704 is in position #2, the output of complex combiner 703 is applied to phase de-rotator 701 and the output of phase re-rotator 702 is applied to feedback filter 505 (DFE operation).

Phase de-rotator 701 and phase re-rotator 702 receive an estimate of θ[n] from carrier tracking loop 503, where θ[n] is an estimate at discrete time n of the phase offset. Phase de-rotator 701 operates on equalized complex (I and Q) components denoted $y_n(\theta)=I_n(\theta)+jQ_n(\theta)$, and computes the product $y_n(\theta)e^{-j\theta[n]}$. Decision device 504 maps I and Q components of $y_n(\theta)e^{-j\theta[n]}$ to the nearest symbol d[n]. The symbol d[n] from decision device 504 is applied to phase re-rotater 702, which computes the product $d[n]e^{+j\theta[n]}$. Thus, for DFE operation, the feedback signal from feedback filter 505 is re-rotated to align in phase with the output signal from forward filter 501.

Carrier tracking loop 503 generates an estimate of θ[n] provided to phase de-rotator 701 and phase re-rotator 702. Embodiments of the present invention operating in the passband (e.g. FECL module 502b such as shown in FIG. 7) may generate an estimate of θ[n] using one of at least two configurations. These configurations provide an advantage in that both forward filter 501 and feedback filter 505 process data that is not precisely at baseband.

In the fourth exemplary configuration of FECL module 502b, carrier tracking loop 503 receives $Re\{z[n]e^{-j\theta[n]}\}$. The signal z[n] denotes the complex output signal from complex combiner 703 defined by $z[n]=y_n(\theta)-w[n]$, where $y_n(\theta)$ is the output of the forward filter 501 and w[n] is the output of the feedback filter 505. The value for $e_{SA\text{-}CM}[n]$ is computed with data signal $z[n]e^{-j\theta[n]}$, where $z[n]=y_n(\theta)-w[n]$. The contribution DT[n] for the fourth configuration is as given in equation (12):

$$DT[n]=Re\{y_n(\theta)-w[n]\}\cos(\theta[n])+Im\{y_n(\theta)-w[n]\}\sin(\theta[n]). \quad (12)$$

In the fifth exemplary configuration of FECL module 502b, the carrier tracking loop 503 operates on the Re{d[n]}, where d[n] is the complex output of decision device 504. The value for $e_{SA\text{-}CM}[n]$ is thus computed with d[n]. The contribution DT[n] for the fifth configuration is as given in equation (13):

$$DT[n]=f'(Re\{(y_n(\theta)-w[n])e^{-j\theta[n]}\})Im\{(y_n(\theta)-w[n])e^{-j\theta[n]}\} \quad (13)$$

where the function f'(●) is as defined above.

Figure 9:
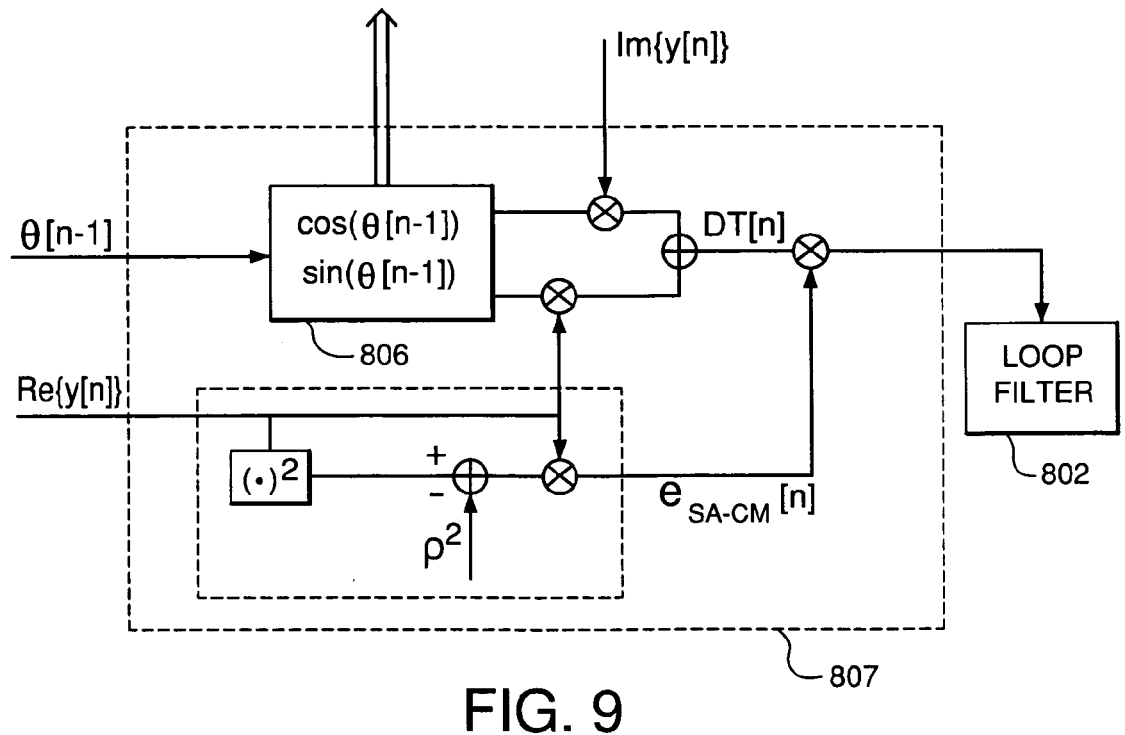
FIG. 9 shows an exemplary implementation for a portion of the carrier tracking loop operating in accordance with a first configuration of the FECL module of FIG. 6.

FIG. 9 shows an exemplary implementation for portion 807 of carrier tracking loop 503 operating in accordance with the first configuration of FECL module 502a of FIG. 6. At discrete time n, SA-CM phase detector 801 operates on the previous estimate of θ[n−1] and on the inputs $Re\{y_n(\theta)\}$ and $Im\{y_n(\theta)\}$. The signal $Re\{y_n[\theta]\}$ is used to compute $e_{SA\text{-}CM}[n]$ by squaring $Re\{y_n(\theta)\}$, subtracting $\rho^2$ and multiplying the difference by $Re\{y_n(\theta)\}$. The signal DT[n] is formed by i) multiplying the sine of θ[n−1] with $Re\{y_n(\theta)\}$, ii) multiplying the cosine of θ[n−1] with $Im\{y_n(\theta)\}$, and iii) adding the two intermediary products of i) and ii). The phase detector signal is formed by multiplying $e_{SA\text{-}CM}[n]$ with DT[n] to drive loop filter 802. Samples at discrete time (n−1) are employed in the calculation of DT[n] to specify that the current value of θ[n] is derived from the previous estimate of θ[n−1].

Implementations for the second and third configurations of FECL module 502a, and for the fourth and fifth exemplary configurations of FECL module 502b, are derived in a similar manner to that shown and described for the first configuration of FIG. 9. One skilled in the art would realize that the implementation of FIG. 9 is exemplary only, and many different implementations may be designed that perform the calculations as outlined herein.

Figure 10:
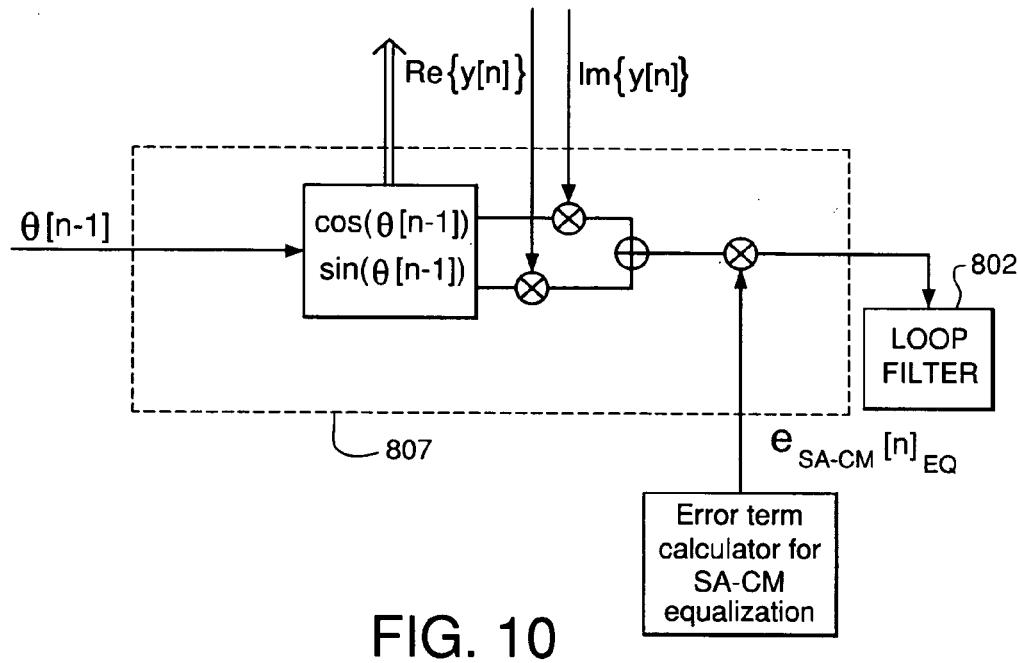
FIG. 10 shows an exemplary implementation for a portion of the carrier tracking loop when the carrier phase error term is calculated externally to the carrier tracking loop.

FIG. 10 shows an implementation of module 807 when $e_{SA\text{-}CM}[n]$ is calculated externally to the carrier tracking loop 503, such as when the receiver uses the SA-CM error term generated for adaptation of the taps of the equalizer. The value used for $e_{SA-CM}[n]$ is the computed equalizer error term $e_{SA-CM}[n]_{EQ}$ (for example, from a look up table) which is also applied to SA-CM phase detector 801. Otherwise, carrier recovery for the implementation of module 807 of FIG. 10 operates in a similar manner to that described with respect to FIG. 9. Thus, the processes of adaptively generating tap coefficients for equalization and estimation of carrier phase may be jointly optimized.

Figure 11:
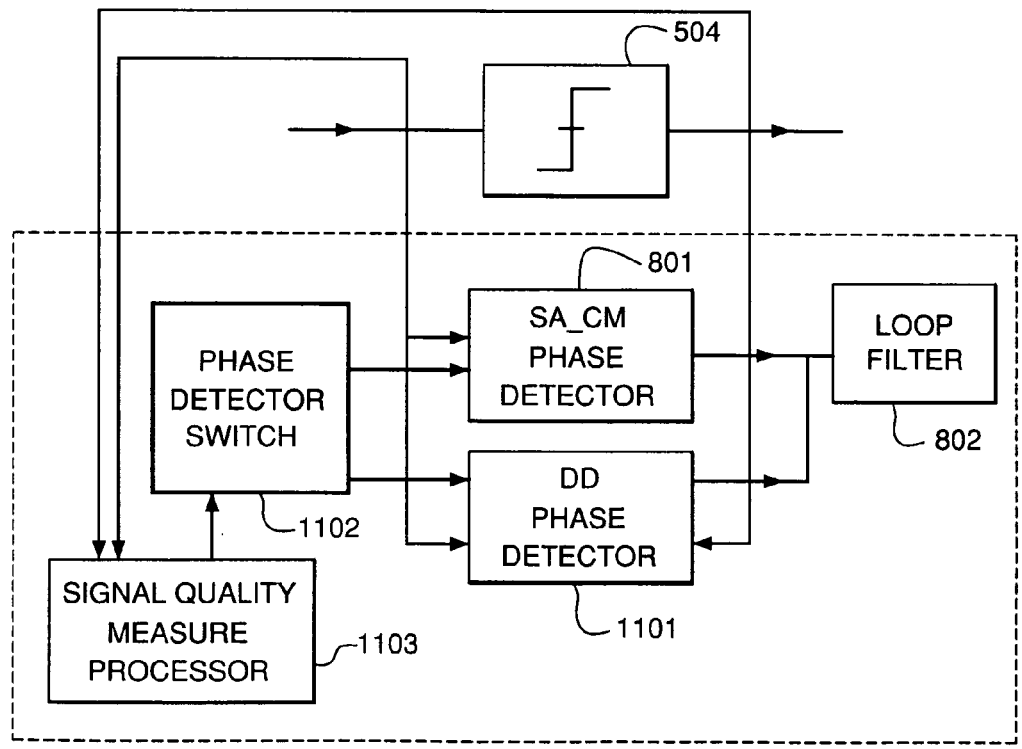
FIG. 11 shows an exemplary carrier tracking loop employing adaptive switching between a SA-CM phase detector and other types of phase detectors based on relative quality of the received signal.

Some embodiments of the present invention may employ soft-switching criteria to adaptively switch modes between SA-CM (blind) phase detection and a decision-directed (DD) phase detection for carrier recovery. Such adaptive switching may be based on relative quality of the received signal. As shown in FIG. 11, carrier tracking loop 503 may include signal quality measure (SQM) processor 1103, phase detector switch 1102, and DD phase detector 1101 in addition to the SA-CM phase detector 801. DD phase detector 1101 determines a corresponding estimate of carrier phase error based on a cost-based error term. For example, DD phase detector 1101 may employ a least mean square (LMS) error term $e_{LMS}[n]$, when operating in a decision-directed mode. Other types of phase detectors may be further included that generate carrier phase error terms in accordance with other methods. SQM processor 1103 may monitor the received signal quality to determine if estimates of the symbol value are relatively accurate, based on some predetermined threshold. SQM processor 1101 may thus generate a signal quality measure (SQM) that is provided to phase detector switch 1102. Using SQM, phase detector switch 1102 selects one or more of the cost-based timing errors (e.g., $e_{SA-CM}[n]$ or $e_{LMS}[n]$). The selected cost-based timing errors may then be used alone or in combination by phase detector switch 1102 for generating the estimate of angle $\theta$.

Signal quality measured by signal quality processor 1103 may include: 1) signal-to-noise ratio (SNR) for the signal output from equalizer 461 (FIG. 4); and 2) SNR for the signal from, for example, a trellis decoder of detector 424 or decoder 425. In addition, signal quality processor 1103 may use criteria for symbol-by-symbol switching between SA-CMA and LMS update modes for an adaptive equalizer. Such switching may be as described in a U.S. patent application Ser. No. 09/549,368, entitled "A HYBRID SOFT AND HARD DECISION FEEDBACK EQUALIZER," filed on Apr. 14, 2000, which is incorporated herein by reference. Signal quality processor 614 may also use a prescribed number of symbol intervals between signal (timing) acquisition and the beginning of symbol processing. Signal quality processor 1103 may use these factors alone or in combination to generate SQM.

One skilled in the art would understand that the equations described herein, such as equations (3) through (13), may include scaling, change of sign, or similar constant linear modifications that are not shown for simplicity. One skilled in the art would realize that such modifications are readily determined or derived for the particular implementation. Thus, each of the described equations may be subject to such modifications, and are not limited to the exact forms presented herein.

To reduce stochastic jitter, error terms derived in accordance with the CM criterion may be modified by jointly equalizing and decoding. U.S. patent application Ser. No. 9/099,730 entitled "A METHOD OF ESTIMATING TRELLIS ENCODED SYMBOLS UTILIZING SIMPLIFIED TRELLIS DECODING," filed on Nov. 20, 2000, and US patent application entitled "DATA SLICER FOR COMBINED TRELLIS DECODING AND EQUALIZATION," filed on Nov. 20, 2000, describe various decision devices which perform partial trellis decoding and are incorporated herein by reference. For a VSB-modulated signal in accordance with the ATSC standard (an "ATSC 8-VSB signal"), the 8-level signal is decomposed into disjoint sets, each set with less than 8 elements (a "set-partitioned signal"). U.S. patent application Ser. No. 09/457,496, entitled "EQUALIZER METHOD AND APPARATUS USING BLIND CMA EQUALIZATION AND PARTIAL DECODING," filed Oct. 9, 1999, and incorporated herein by reference, employs the set-partitioned signals to define a new CM error term that incurs less stochastic jitter than the original CM error term. It is understood by one skilled in the art that such techniques to generate modified CM error terms may be employed in forming error signals in accordance with the present invention.

Since the CM error term is a cubic function of the signal $y_n(\theta)$, particular implementations of the present invention using finite precision may require large bit-width multipliers and accumulators. To reduce the computational burden, low-complexity implementations of the CMA error term have been developed, such as those described in U.S. patent application Ser. No. 09/231,888, entitled "ADAPTIVE EQUALIZER WITH ENHANCED ERROR QUANTIZATION," filed Jan. 14, 1999, and U.S. patent application Ser. No. 09/261,843 "ADAPTIVE EQUALIZER WITH DECISION DIRECTED CONSTANT MODULUS ALGORITHM," filed March 1999, whose teachings are incorporated herein by reference. As would be apparent to one skilled in the art, the various methods of carrier recovery and synchronization described herein may be extended to include the use of quantized versions of blind error terms.

Although the present invention is described herein with respect to the SA-CM cost function, the present invention is not so limited and may be extended in general to carrier recovery based on single-axis blind cost criteria as a class. For example, one skilled in the art may extend the teachings herein to include criteria of Bussgang-class cost functions that may be related to the CM and SA-CM cost function described herein. The Bussgang-class of functions are well-known in the art and are described in, for example, Simon Haykin, *Blind Deconvolution*, Chapter 2, PTR Prentice-Hall, Englewood Cliffs, N.J. (1994), whose teachings are incorporated herein by reference.

The present invention has been described with respect to a digital television receiver, and in particular, to digital television signals transmitted as symbols with quadrature amplitude modulation (QAM), an phase-shift keyed modulation (PSK), or a vestigial sideband modulation (VSB). However, one skilled in the art would realize that the techniques described herein may be applied to any receiver processing QAM, PSK, or VSB signals.

As would be apparent to one skilled in the art, the various functions of carrier recovery, tracking, and carrier phase detection may be implemented with circuit elements or may also be implemented in the digital domain as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of carrier phase detection in a demodulated signal formed from a data-modulated carrier, the method comprising:
   a) generating, from the signal, an estimate of an angle between the carrier and a locally generated reference based on a stochastic gradient of a single-axis (SA) cost function, the cost function being a Bussgang-class cost function; and
   b) adjusting at least one of the frequency and phase of the demodulated signal based on the angle such that the magnitude of the angle is driven toward a predetermined value, wherein:
   step a) generates the estimate by:
   a1) calculating an SA cost function error term based on the demodulated signal, wherein the single-axis cost function is a single-axis constant modulus criterion $J_{CM}$;
   a2) forming an approximation of a derivative of the demodulated signal with respect to the angle; and
   a3) combining the SA cost function error term with the approximation to form a phase error; and
   a4) generating the angle from the phase error; and
   for step a3), the phase error is the stochastic gradient of the single-axis constant modulus criterion $J_{CM}$ ($dJ_{CM}/d\theta$) given by:

$dJ_{CM}/d\theta = 4e_{SA-CM}[n]DT[n]$, where $e_{SA-CM}$ is the SA cost function error term defined by $(Re\{y_n(\theta)\}^2 - \rho^2)Re\{y_n(\theta)\}$, $y_n(\theta)$ is input data based on the demodulated signal, and $DT[n]$ approximates a derivative of the demodulated signal with respect to the angle $\theta$ ($d(y_n(\theta))/d\theta$).

2. The invention as recited in claim 1, wherein $e_{SA-CM}[n]$ is based on a rotated signal $y_n(\theta)e^{-j\theta[n-1]}$, and $DT[n]$ is equivalent to:

$Re\{y_n(\theta)e^{-j\theta[n]}\} = Re\{y_n(\theta)\}\cos(\theta[n]) + Im\{y_n(\theta)\}\sin([n])$, where $Re\{\bullet\}$ extracts the (real) I component.

3. The invention as recited in claim 1, wherein $e_{SA-CM}[n]$ is based on a rotated data signal $y_n(\theta)e^{-j\theta[n]}$ adjusted to account for feedback filter equalization, and $DT[n]$ is equivalent to:

$Re\{y_n(\theta)e^{-j\theta[n]}\} = Re\{y_n(\theta)\}\cos(\theta[n]) + Im\{y_n(\theta)\}\sin(\theta[n])$, where $Re\{\bullet\}$ extracts the (real) I component.

4. The invention as recited in claim 1, wherein $e_{SA-CM}[n]$ is based on a decision $d[n]$ for a rotated data signal $y_n(\theta)e^{-j\theta[n]}$ adjusted to account for feedback filter equalization $(y_n(\theta)e^{-j\theta[n]} - w[n])$, the decision $d[n]$ given as:

$f(Re\{y_n(\theta)e^{-j\theta[n]} - w[n]\})$ where $f(\bullet)$ denotes the decision function which operates on a real-valued data signal, and $DT[n]$ is equivalent to:

$f'(Re\{y_n(\theta)e^{-j\theta[n]} - w[n]\})Im\{y_n(\theta)e^{-j\theta[n]} - w[n]\}$ where $Im\{\bullet\}$ extracts the (imaginary) Q component, and $f'(\bullet)$ is the derivative of the decision function.

5. The invention as recited in claim 1, wherein $e_{SA-CM}[n]$ is based on the data signal $z[n]e^{-j\theta[n]}$, where $z[n] = y_n(\theta) - w[n]$, $y_n(\theta)$ is the data signal having forward filter equalization, and $w[n]$ is the feedback filtered equalized data signal, and $DT[n]$ is equivalent to:

$Re\{y_n(\theta) - w[n]\}\cos(\theta[n]) + Im\{y_n(\theta) - w[n]\}\sin(\theta[n])$.

6. The invention as recited in claim 1, wherein $e_{SA-CM}[n]$ is based on a real component of a decision $d[n]$, $Re\{d[n]\}$, for a rotated data signal $y_n(\theta)e^{-j\theta[n]}$ adjusted to account for feedback filter equalization $(y_n(\theta)e^{-j\theta[n]} - w[n])$ the decision $d[n]$ given as:

$f(Re\{y_n(\theta)e^{-j\theta[n]} - w[n]\})$ where $f(\bullet)$ denotes the decision function which operates on a real valued data signal, and $DT[n]$ is equivalent to:

$f'(Re\{(y_n(\theta) - w[n])e^{-j\theta[n]}\})Im\{(y_n(\theta) - w[n])e^{-j\theta[n]}\}$ where $Re\{\bullet\}$ extracts the (real) I component, and $f'(\bullet)$ is the derivative of the decision function.

7. The invention as recited in claim 1, wherein, for step b), the locally generated reference is adjusted by shifting, in frequency, the demodulated signal substantially to baseband.

8. The invention as recited in claim 1, further comprising
   c) generating a signal quality measure (SQM) from the demodulated signal; and
   d) generating at least one other cost error term based on a corresponding cost criterion, and wherein
   step a) generates the angle based on the SQM.

9. The invention as recited in claim 8, wherein step a) generates the angle based on the SQM by adaptively switching between either i) one of the cost error terms, or ii) a weighted combination of cost error terms that is combined with the approximation of the derivative.

10. The invention as recited in claim 8, wherein one of the cost error terms is a least mean square error term.

11. The invention as recited in claim 8, wherein one of the cost error terms is a CMA error term.

12. The invention as recited in claim 1, further comprising applying equalization to the demodulated signal with forward and/or feedback filters.

13. The invention as recited in claim 12, wherein step a) generates the estimate of the angle based on the equalized, demodulated signal.

14. The invention as recited in claim 12, further comprising generating a decision for the data of the equalized, demodulated signal, and wherein step a) generates the estimate of the angle based on the decision for the data of the equalized, demodulated signal.

15. The invention as recited in claim 14, wherein step a) generates the estimate of the angle based on both the equalized, demodulated signal and on the decision for the data of the equalized, demodulated signal.

16. The invention as recited in claim 12, wherein applying equalization applies either linear equalization or decision feedback equalization.

17. The invention as recited in claim 12, wherein step a) generates the angle based on an SA cost function error term that is generated during equalizer adaptation as tap-coefficients are updated by applying equalization to the demodulated signal.

18. The invention as recited in claim 12, wherein applying equalization employs the feedback filter operating on signals either in the passband or substantially near the baseband derived from the forward filter.

19. The invention as recited in claim 1, wherein, for step a), the data-modulated signal is the carrier modulated by the data in accordance with a vestigial sideband (VSB) format.

20. The invention as recited in claim 1, wherein, for step a), the data-modulated signal is a digital television signal having its data encoded in accordance with an ATSC standard.

21. Apparatus for carrier phase detection in a demodulated signal formed from a data-modulated carrier, the apparatus comprising:
  a carrier tracking loop configured to generate, from the signal, an estimate of an angle between the carrier and a locally generated reference based on a stochastic gradient of a single-axis (SA) cost function, the cost function being a Bussgang-class cost function; and
  a rotation combiner adapted to adjust at least one of the frequency and phase of the demodulated signal based on the angle such that the magnitude of the angle is driven toward a predetermined value, wherein:
  the carrier tracking loop comprises:
    a1) a phase detector adapted to calculate an SA cost function error term based on the demodulated signal, wherein the single-axis cost function is a single-axis constant modulus criterion $J_{CM}$;
    a2) a first circuit configured to form an approximation of a derivative of the demodulated signal with respect to the angle; and
    a3) a rotation combiner configured to combine the SA cost function error term with the approximation to form a phase error; and
    a4) a second circuit configured to generate the angle from the phase error; and
  the phase error is the stochastic gradient of the single-axis constant modulus criterion $J_{CM}$ ($dJ_{CM}/d\theta$) given by:

$$dJ_{CM}/d\theta = 4e_{SA\text{-}CM}[n]DT[n],$$

where $e_{SA\text{-}CM}$ is the SA cost function error term defined by $(\text{Re}\{y_n(\theta)\}^2 - \rho^2)\text{Re}\{y_n(\theta)\}$, $y_n(\theta)$ is input data based on the demodulated signal, and $DT[n]$ approximates a derivative of the demodulated signal with respect to the angle $\theta$ ($d(y_n(\theta))/d\theta$).

22. The invention as recited in claim 21, wherein the rotation combiner is adapted to adjust the locally generated reference to shift, in frequency, the demodulated signal substantially to baseband.

23. The invention as recited in claim 21, further comprising:
  a signal quality measure processor configured to generate a signal quality measure (SQM) from the demodulated signal; and
  at least one other phase detector, each phase detector configured to generate a corresponding cost function error term based on a corresponding cost criterion, and wherein
  the carrier tracking loop adapted to generate the angle based on the SQM.

24. The invention as recited in claim 23, wherein the carrier tracking loop is adapted to generate the angle based on the SQM by adaptively switching between either i) one of the cost error terms, or ii) a weighted combination of cost error terms that is combined with the approximation of the derivative.

25. The invention as recited in claim 23, wherein at least one other cost error term is a least mean square error term.

26. The invention as recited in claim 21, further comprising an equalizer having a forward filter and a feedback filter, the carrier tracking loop coupled to the forward filter to receive the demodulated signal.

27. The invention as recited in claim 26, wherein the estimate of the angle is based on the demodulated signal filtered with the forward filter.

28. The invention as recited in claim 26, further comprising a decision circuit adapted to generate a decision for the data of the equalized, demodulated signal, and wherein the carrier tracking loop is adapted to generate the estimate of the angle based on the decision for the data of the equalized, demodulated signal.

29. The invention as recited in claim 28, wherein the estimate of the angle is based on both the equalized, demodulated signal and on the decision for the data of the equalized, demodulated signal.

30. The invention as recited in claim 26, wherein the equalizer is either a linear equalizer or a decision feedback equalizer.

31. The invention as recited in claim 26, wherein the carrier tracking loop is adapted to receive an SA-cost function error term to generate the estimate of the angle, the SA-cost function error term generated during a tap-coefficient update process of the equalizer.

32. The invention as recited in claim 26, wherein the equalizer is adapted to employ the feedback filter operating on signals either in the passband or substantially near the baseband derived from the forward filter.

33. The invention as recited in claim 21, wherein the data-modulated signal is the carrier modulated by the data in accordance with a vestigial sideband (VSB) format.

34. The invention as recited in claim 21, wherein the data-modulated signal is a digital television signal having its data encoded in accordance with an ATSC standard.

35. A computer-readable medium having stored thereon a plurality of instructions, the plurality of instructions including instructions which, when executed by a processor, cause the processor to implement a method for carrier phase detection in a demodulated signal formed from a data-modulated carrier, the method comprising:
  a) generating, from the signal, an estimate of an angle between the carrier and a locally generated reference based on a stochastic gradient of a single-axis cost function, the cost function being a Bussgang-class cost function; and
  b) adjusting at least one of the frequency and phase of the demodulated signal based on the angle such that the magnitude of the angle is driven toward a predetermined value, wherein:
  step a) generates the estimate by:
    a1) calculating an SA cost function error term based on the demodulated signal, wherein the single-axis cost function is a single-axis constant modulus criterion $J_{CM}$;
    a2) forming an approximation of a derivative of the demodulated signal with respect to the angle: and a3) combining the SA cost function error term with the approximation to form a phase error: and a4) generating the angle from the phase error: and for step a3), the phase error is the stochastic gradient of the single-axis constant modulus criterion $J_{CM}$ ($dJ_{CM}/d\theta$) given by:

$$dJ_{CM}/d\theta = 4e_{SA-CM}[n]DT[n],$$

where $e_{SA-CM}$ is the SA cost function error term defined by $(Re\{y_n(\theta)\}^2-\rho^2)Re\{y_n(\theta)\}$, $y_n(\theta)$ is input data based on the demodulated signal, and $DT[n]$ approximates a derivative of the demodulated signal with respect to the angle $\theta$ ($d(y_n(\theta))/d\theta$).

36. A method of carrier phase detection in a demodulated signal formed from a data-modulated carrier, the method comprising:

a) generating, from the signal, an estimate of an angle between the carrier and a locally generated reference based on an estimate of a gradient of a single-axis cost function, the cost function being a Bussgang-class cost function; and b) adjusting at least one of the frequency and phase of the demodulated signal based on the angle such that the magnitude of the angle is driven toward a predetermined value, wherein:

step a) generates the estimate by:

a1) calculating an SA cost function error term based on the demodulated signal, wherein the single-axis cost function is a single-axis constant modulus criterion $J_{CM}$;

a2) forming an approximation of a derivative of the demodulated signal with respect to the angle; and a3) combining the SA cost function error term with the approximation to form a phase error; and a4) generating the angle from the phase error; and for step a3), the phase error is the stochastic gradient of the single-axis constant modulus criterion $J_{CM}(dJ_{CM}/d\theta)$ given by:

$$dJ_{CM}/d\theta = 4e_{SA-CM}[n]DT[n],$$

where $e_{SA-CM}$ is the SA cost function error term defined by $(Re\{y_n(\theta)\}^2-\rho^2)Re\{y_n(\theta)\}$, $y_n(\theta)$ is input data based on the demodulated signal, and $DT[n]$ approximates a derivative of the demodulated signal with respect to the angle $\theta$ ($d(y_n(\theta))/d\theta$).

37. A method of carrier phase detection in a demodulated signal formed from a data-modulated carrier, the method comprising:

a) generating, from the signal, an estimate of an angle between the carrier and a locally generated reference based on a stochastic gradient of a single-axis (SA) cost function, the cost function being a Bussgang-class cost function, wherein step a) generates the estimate by:

a1) calculating an SA cost function error term based on the demodulated signal;

a2) forming an approximation of a derivative of the demodulated signal with respect to the angle; and a3) combining the SA cost function error term with the approximation to form a phase error; and a4) generating the angle from the phase error; and b) adjusting at least one of the frequency and phase of the demodulated signal based on the angle such that the magnitude of the angle is driven toward a predetermined value;

c) generating a signal quality measure (SQM) from the received signal; and d) generating at least one other cost error term based on a corresponding cost criterion, and wherein step a) generates the angle based on the SQM.

38. The invention as recited in claim 37, wherein step a) generates the angle based on the SQM by adaptively switching between either i) one of the cost error terms, or ii) a weighted combination of cost error terms that is combined with the approximation of the derivative.

39. Apparatus for carrier phase detection in a demodulated signal formed from a data-modulated carrier, the apparatus comprising:

a carrier tracking loop configured to generate, from the signal, an estimate of an angle between the carrier and a locally generated reference based on a stochastic gradient of a single-axis (SA) cost function, the cost function being a Bussgang-class cost function, wherein the carrier tracking loop comprises:

a1) a phase detector adapted to calculate an SA cost function error term based on the demodulated signal;

a2) a first circuit configured to form an approximation of a derivative of the demodulated signal with respect to the angle; and a3) a rotation combiner configured to combine the SA cost function error term with the approximation to form a phase error; and a4) a second circuit configured to generate the angle from the phase error;

a rotation combiner adapted to adjust at least one of the frequency and phase of the demodulated signal based on the angle such that the magnitude of the angle is driven toward a predetermined value;

a signal quality measure processor configured to generate a signal quality measure (SQM) from the demodulated signal; and at least one other phase detector, each phase detector configured to generate a corresponding cost function error term based on a corresponding cost criterion, wherein the carrier tracking loop is adapted to generate the angle based on the SQM.

40. The invention as recited in claim 39, wherein the carrier tracking loop is adapted to generate the angle based on the SQM by adaptively switching between either i) one of the cost error terms, or ii) a weighted combination of cost error terms that is combined with the approximation of the derivative.

* * * * *

UNITED STATES PATENT AND TRADEMARK OFFICE
CERTIFICATE OF CORRECTION

PATENT NO.       : 7,031,405 B1
APPLICATION NO.  : 09/922006
DATED            : April 18, 2006
INVENTOR(S)      : Azzedine Touzni et al.

It is certified that error appears in the above-identified patent and that said Letters Patent is hereby corrected as shown below:

In Column 17, on line 57, replace

"$Re\{y_n(\Theta)e^{-j\Theta[n]}\} = Re\{y_n(\Theta)\}\cos(\Theta[n]) + Im\{y_n(\Theta)\}\sin([n]),$" with --$Re\{y_n(\Theta)e^{-j\Theta[n]}\} = Re\{y_n(\Theta)\}\cos(\Theta[n]) + Im\{y_n(\Theta)\}\sin(\Theta[n]),$--.

Signed and Sealed this

Fifteenth Day of August, 2006

JON W. DUDAS
*Director of the United States Patent and Trademark Office*